Figure 1:
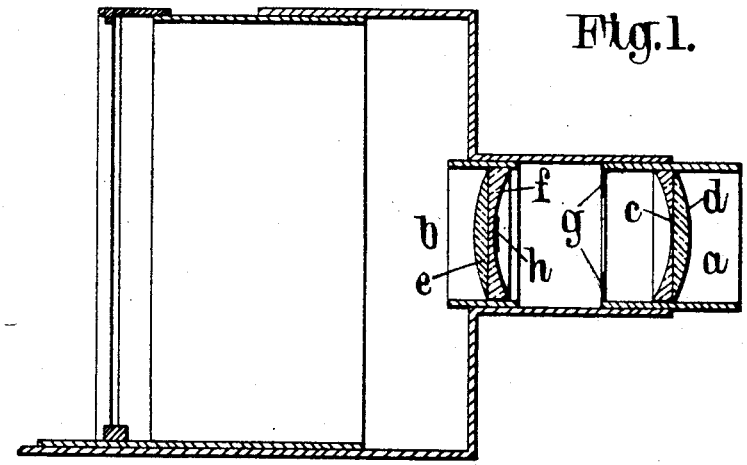

INVENTOR
Clyde Jay Coleman
BY W. H. Babcock & Son
ATTORNEYS

Patented July 7, 1931

1,813,439

UNITED STATES PATENT OFFICE

CLYDE JAY COLEMAN, OF LONDON, ENGLAND

LENS OF PHOTOGRAPHIC CAMERAS, PICTURE PROJECTING APPARATUS, AND OTHER LIKE OPTICAL DEVICES

Application filed March 18, 1925. Serial No. 16,503.

This invention relates to cameras for taking still and motion pictures, picture projecting apparatus—such as are used for throwing pictures upon a screen—and like optical devices (all of which are hereinafter deemed to be included when reference is made to "camera") and has for its object improvements whereby a sharper definition and greater life-like plasticity is obtained.

I have found that this purpose is served by providing the camera or like apparatus with a supplementary stop located at or near the centre of the aperture and in a different plane from the usual marginal stop. In this way different areas of the lens are reserved for the rays reflected from objects in corresponding areas of the field and as a result the effect that results from other rays passing through the same area of the lens, is avoided. With this arrangement the rays reflected from objects on or near the optical axis pass through the annular aperture between the central and marginal stops and through that part of the lens behind it while the rays reflected from objects in other parts of the field pass through the more or less crescent-shaped aperture formed between the same stops (according to the direction of the said rays) and the portion of the lens upon which such rays fall, all of which will be refracted by the lens in the well-known way and focussed in their proper positions on a plate or screen or equivalent part situated in the focal plane.

In this way a stronger image of objects is projected onto the plate or screen giving them a more sharply defined outline and producing greater plasticity.

According to one mode of carrying this invention into practice a supplementary stop preferably in the form of a disc is situated on or near the optical axis of the lens. This stop is smaller than the aperture formed by the usual marginal stop and may be opaque or semi-opaque, may be circular or of any other suitable shape and may in some cases be situated eccentrically. With this arrangement an image of the objects on the optical axis and near it or the meridian on which the screen is situated is projected by those rays reflected therefrom that pass through the aperture constituted by the marginal and central stops to the lens while the rays of light reflected from other objects in the field passes obliquely through the said aperture to portions of the lens determined by the position of each such object.

By locating the aforesaid supplementary central stop at the back of the lens surface when a single lens is used or in front of the back component of a compound lens, "flare" resulting from internal reflection is reduced.

A normal orifice stop of known kind may be employed with the supplementary central stop which latter may be applied to either the front or back surface of the lens, and when two or more lenses are employed all or any of them may be similarly provided with similar supplementary stops, the dimensions of which may vary. In some cases the said supplementary stop or stops may be suitably supported at a point or points in front of or behind the lens or lenses and their respective positions may be adjustable.

It is of course understood that shutters, diaphragms, focusing means and means for properly positioning the films and plates or a combination of any of these devices may be employed with the improvements hereinbefore described.

I will now proceed to more particularly describe my invention with the aid of the accompanying drawings, in which—

Figure 4:
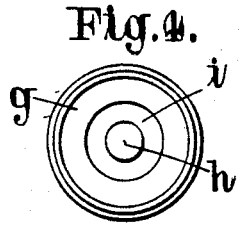
Figure 2:
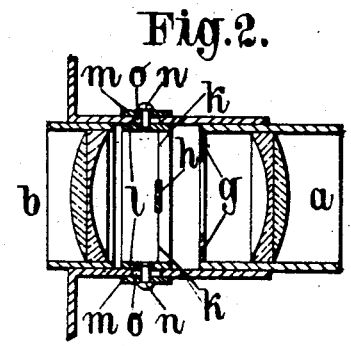
Figure 5:
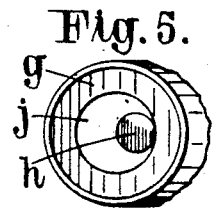
Figure 6:
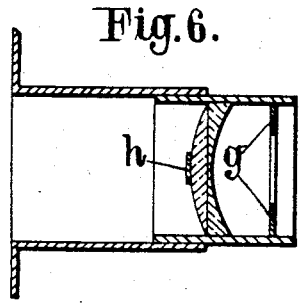
Figure 3:
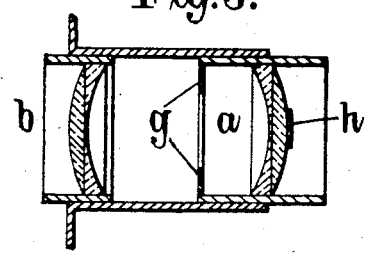

Fig. 1 is a diagrammatical longitudinal section through the improved camera showing one arrangement of the lenses and stops, Figs. 2 and 3 are longitudinal sections through the lenses showing different arrangements of the stops, Fig. 4 is a front view of the marginal and central stops, Fig. 5 is an oblique front view of the said stops, and Fig. 6 is a diagrammatical longitudinal section through a single lens showing the arrangement of the stops.

According to the arrangement shown in Fig. 1 the camera is provided with a compound lens comprising the components $a$ $b$ each of which consist of two lenses $c$ $d$ $e$ $f$.

A marginal stop *g* of known kind is situated between the two components *a* and *b* and a central stop *h* is applied to the front face of the lens *f* of the rear component *b*.

With this arrangement the light reflected from an object on or near the optical axis of the system will pass through the annulus *i* in Fig. 4 between the outer edge of the central stop *h* and the inner edge of the marginal stop *g* whereas the rays of light reflected from objects nearer to the margin of the field will pass through the aperture *j* shown in Fig. 5 which will be more or less crescent-shaped according to whether the direction of said rays is more or less inclined to the axis of the system.

According to the arrangement shown in Fig. 2 the supplemental stop *h* is supported in a position between the marginal stop *g* and the rear component *b* of the lens. In this case the supplemental stop *h* may be supported by wires *k* or equivalent parts extending from a ring *l* whose position may be changed so as to adjust the position of the stop *h*.

To enable this adjustment to be conveniently made the ring *l* may be connected to an outher sleeve *m* by rivets *n* that pass through slots *o* in the lens holder.

According to the construction shown in Fig. 3 the supplemental stop *h* may be supported in front of the component *a* of the lens.

When a single lens is employed the stop *h* is preferably applied to its rear surface as is shown in Fig. 6.

I claim:

1. Apparatus for projecting the image of objects to a surface situated in the focal plane of a lens, comprising a lens, a marginal stop formed with an aperture, and a supplementary stop of smaller diameter than said aperture located near the surface of the lens remote from the source of light and in a plane between the marginal stop and the focal plane and near the optical axis of the lens and being adjustable toward or from said marginal stop.

2. Apparatus for projecting the image of objects to a surface situated in the focal plane of a lens, comprising a lens, a marginal stop formed with an aperture, and a supplementary stop of smaller diameter than said aperture, located near the surface of the lens remote from the source of light and in a plane substantially removed from the radial plane of said marginal stop and near the optical axis of the lens.

3. Apparatus for projecting the image of objects to a surface situated in the focal plane of a lens, comprising a lens, a marginal stop formed with an aperture, and a supplementary stop of smaller diameter than said aperture, located near the surface of the lens remote from the source of light and in a plane between the marginal stop and the focal plane, and near the optical axis of the lens.

4. Apparatus for projecting the image of objects to a surface situated in the focal plane of a lens comprising a lens, and a central stop located near the surface of the lens remote from the source of light and of sufficient area to stop off internal reflections within the lens but sufficiently limited to allow of oblique rays emanating from the central portion of objects to be transmitted and refracted around it to form a complete image of the whole object during photography or projection.

5. Apparatus for projecting the image of objects onto a surface situated in the focal plane of a lens, comprising a lens, a marginal stop formed with a large central aperture, and a supplementary stop of smaller diameter than said aperture located near the surface of the lens remote from the source of light.

In testimony whereof, I have signed my name to this specification at London this 27th day of February, 1925.

CLYDE JAY COLEMAN.